(No Model.) 4 Sheets—Sheet 2.
J. ARMSTRONG.
CORN HARVESTER.
No. 408,947. Patented Aug. 13, 1889.
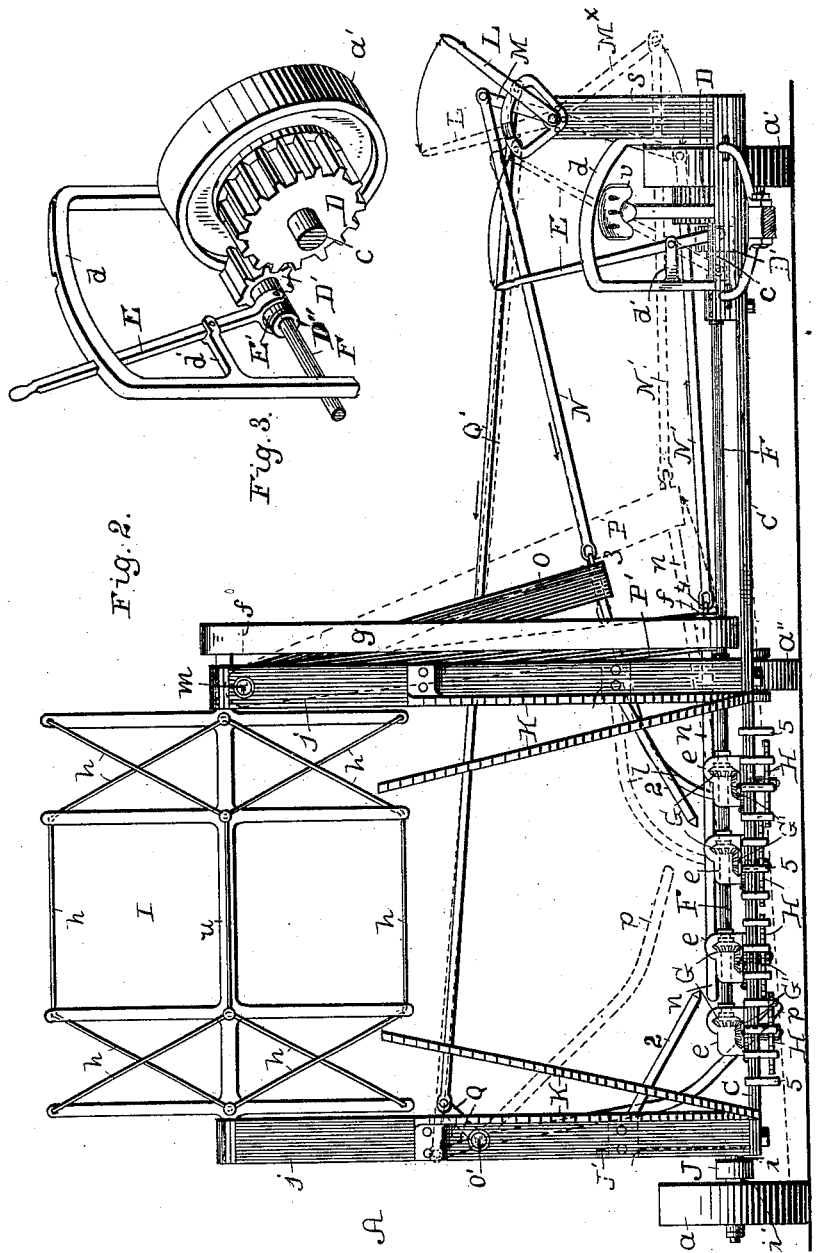
Witnesses
F. G. Fischer
A. A. Higdon
Inventor
John Armstrong
By his Attorney J. C. Higdon (No Model.) 4 Sheets—Sheet 3.
J. ARMSTRONG.
CORN HARVESTER.
No. 408,947. Patented Aug. 13, 1889.
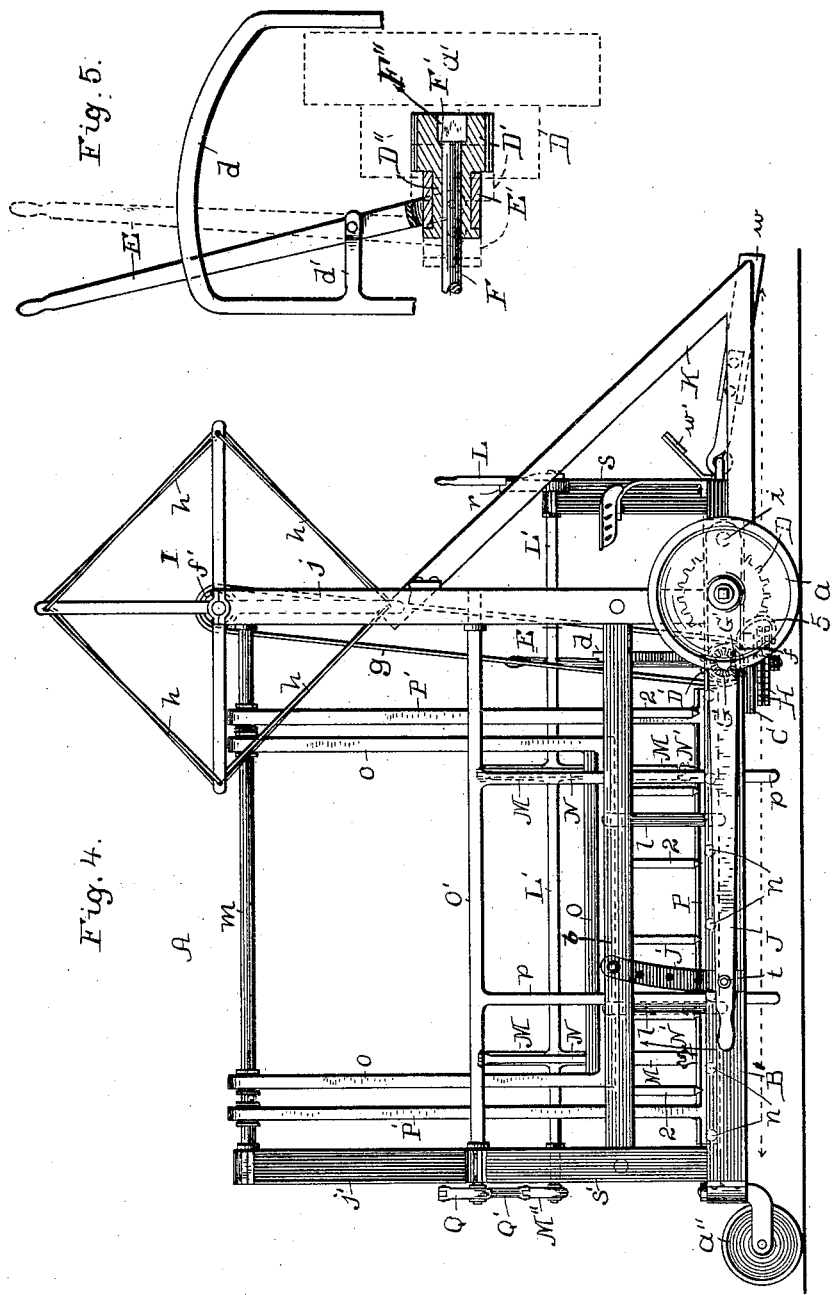
Witnesses
F. G. Fischer
A. A. Higdon
Inventor
John Armstrong
By his Attorney
J. C. Higdon (No Model.) 4 Sheets—Sheet 4.
J. ARMSTRONG.
CORN HARVESTER.
No. 408,947. Patented Aug. 13, 1889.
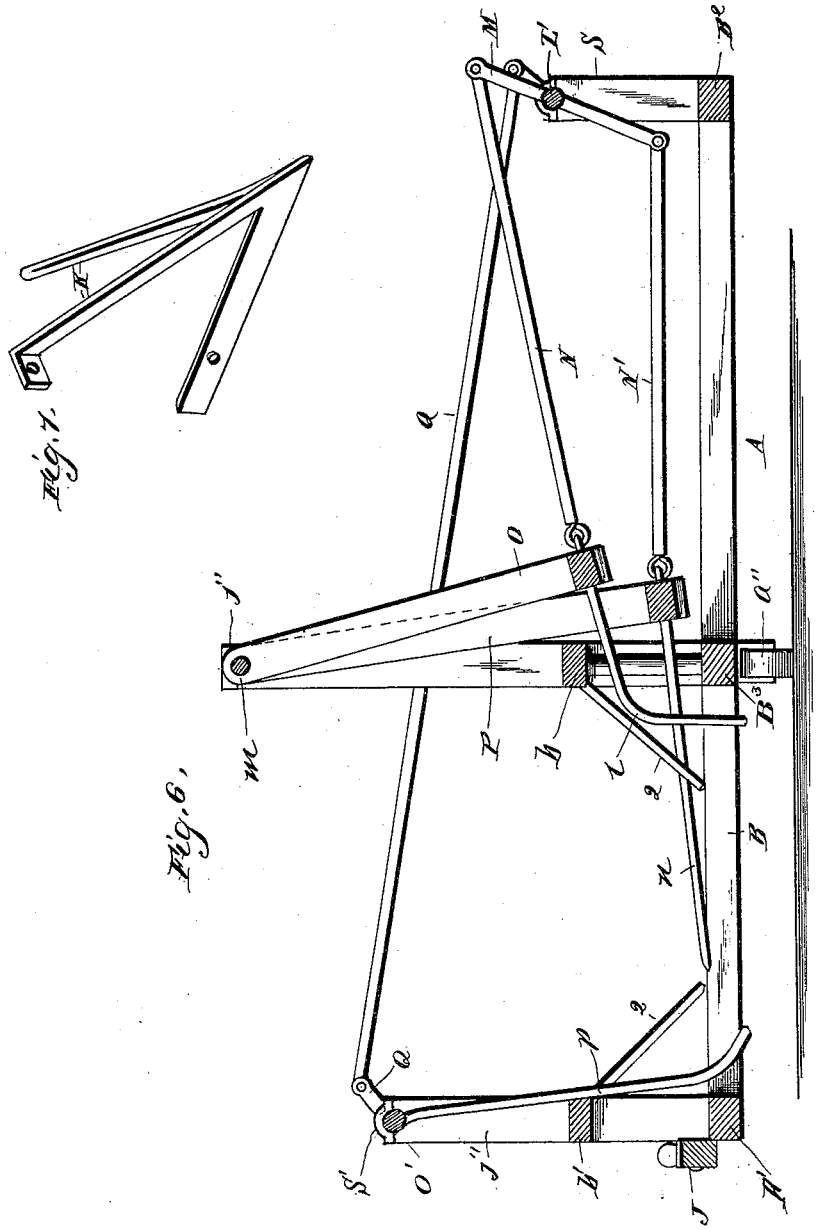
WITNESSES
C. L. Taylor
H. E. Johnson
INVENTOR
John Armstrong.
By J. C. Higdon
his attys.

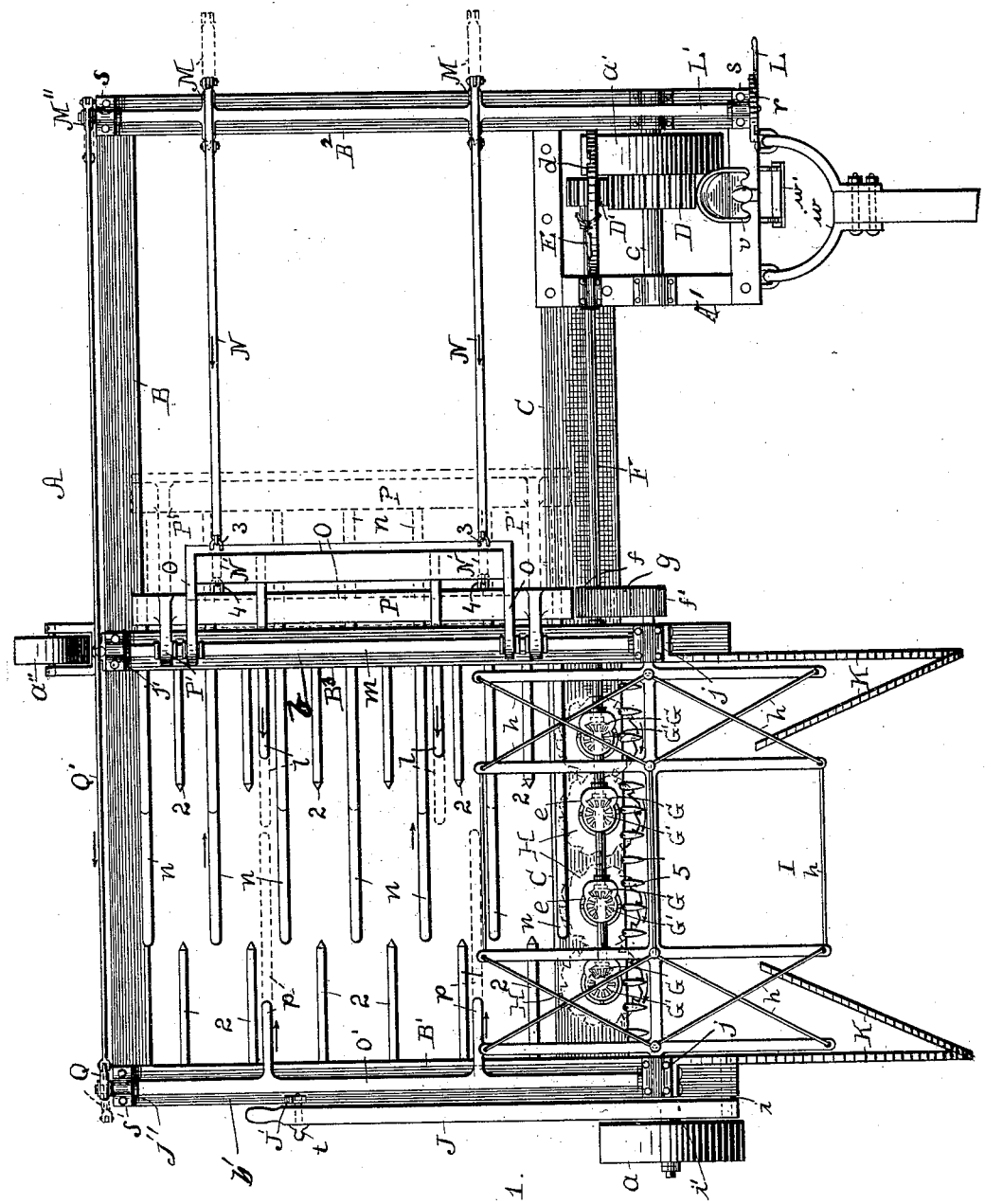

UNITED STATES PATENT OFFICE.

JOHN ARMSTRONG, OF VINE CREEK, KANSAS.

CORN-HARVESTER.

SPECIFICATION forming part of Letters Patent No. 408,947, dated August 13, 1889.

Application filed March 9, 1889. Serial No. 302,633. (No model.)

*To all whom it may concern:*

Be it known that I, JOHN ARMSTRONG, of Vine Creek, Ottawa county, Kansas, have invented certain Improvements in Corn-Harvesters, of which the following is a full, clear, and exact description, reference being had to the accompanying drawings, forming a part hereof.

This invention relates to certain improvements in corn-harvesters; and it consists of the novel combination of parts and their construction, as will more fully appear hereinafter from the following description and accompanying illustrations, in which—

Figure 1 is a plan view of my improved corn-harvester. Fig. 2 is a front elevation of the same. Fig. 3 is an enlarged detailed perspective view of the power-transmitting mechanism or gearing of the driving-shaft. Fig. 4 is a side elevation of my harvester. Fig. 5 is also an enlarged perspective view of a modification of the power-transmitting mechanism or gearing of the driving-shaft. Fig. 6 is a transverse sectional view of the harvester between the rods N N, and Fig. 7 is a detached detail view of one of the gatherers.

In the construction of my improved harvester I employ a carrying-frame A, substantially rectangular in shape, as shown clearly in Fig. 1, and consisting of a front bar C and a rear bar B, both extending the entire width of the machine, a side bar B' on the cutter side of the machine, and a similar side bar B² on the stubble side of the machine. On this frame, at the cutter side, or (as it is also hereinafter termed) the "inner" side thereof, are erected uprights $j\ j'$, respectively at the front and rear ends of the bar B'; and $j\ j'$ also represent similar uprights erected at intermediate points of the front and rear bars C B, respectively. The uprights $j\ j'$ at the cutter side of the machine are connected by a longitudinal horizontal bar $b'$, parallel with the side bar B', and the other uprights $j\ j'$, near the center of the frame, are connected by a similar longitudinal horizontal bar $b$, the functions of all of which are hereinafter set forth.

A supplemental frame A' is affixed to the main frame near its stubble or outer side, the same being horizontal and rectangular in shape, as shown in Fig. 1, and this supplemental frame is projected forward of the front bar C of the main frame and has the draft-tongue connected thereto, as hereinafter described. The side bar B² of the main frame is extended forward of the front bar C to form the outer side of the supplemental frame, and on the front and rear extremities of said side bar are erected uprights $s\ s$, the functions of which will be fully described hereinafter. This supporting-frame is borne by the wheels $a\ a'\ a''$, which are located at the opposite sides of the frame near its front and at the center of its rear bar. The wheel $a'$ is affixed to a horizontal shaft $c$, mounted transversely on the supplemental frame A', and carries a pinion D, and F represents a transverse drive-shaft mounted on the main frame above the front bar C and carrying a sliding pinion D', which is adapted to mesh with the pinion D. The hub D'' of the sliding pinion D' is embraced by a sleeve E', to which is fulcrumed the forked lower end of an operating-lever E, pivoted to an arm $d'$ of the vertical frame $d$, which is bolted in position upon the supplemental frame A' near its rear portion. By means of this lever the sliding pinion may be thrown into and out of gear with the pinion D, whereby the drive-shaft is thrown in or out of gear with the pinion $a'$.

The inner wheel $a$ on the cutter side of the machine is carried by a journal $i'$ on a hand-lever J, which is pivoted at $i$ to the forward end of the side bar B' of the main frame, the rear free end of the said lever being provided with a pin $t$, which engages a serially-apertured curved bar or plate J', applied to the side of the frame A. The lower end of this bar or plate J' is affixed to the bar B' and its upper end is affixed to the bar $b'$, as shown in the drawings. By means of this arrangement the end of the frame A B carrying the cutters or knives (hereinafter described) can be raised or lowered to vary the height of cutting the stalks, according as to whether it is desired to cut them near the ground or higher up.

H H are the cutters or knives, arranged below the bar C of the frame A B and rotary in action, being carried by short vertical shafts held in the said bar and provided at their upper ends with horizontal beveled pinions G', gearing with similar vertical pinions G upon the shaft F. Each two intergearing or meshing pinions G G' is incased by a box $e$; or the whole may be inclosed by a single common casing or box to protect the same from the falling stalks as they pass into frame A B. The boxes or casings $e\ e$ also serve as bearings or supports for the shaft F. In front of the cutters or knives H H are also arranged guards 5, secured to the front edge of the bar C, for the protection of the knives or cutters.

I is the reel, constructed, preferably, as shown, having its middle radial arms, as also its radial end bars, connected together at their outer ends by rods $h\ h$, those of the middle bars crossing at right angles from bar to bar parallel with the axis of the reel, while those of the end bars cross each other diagonally, as shown. The primary office of the reel I is to strike and carry the stalks rearward against the knives or cutters to aid the cutting thereof, the stalks when cut falling rearward across the incased pinion-containing boxes and upon the rake-teeth, as presently seen. The reel I has its shaft $u$ hung in boxes secured upon the upper ends of uprights or standards $j\ j$ of the frame A B. The reel receives motion by means of an endless belt $g$, encompassing a pulley $f$ upon the shaft F and a pulley $f'$ upon the shaft $u$ of said reel.

K K are the gatherers, of substantially the construction shown, having a proximately triangular shape, and each gatherer having its downward and outward inclined arm bolted at its upper end to the uprights or standards $j$, while its other arm is extended upward and inward and laterally toward but some distance from the cutters of the frame A B. This construction of the gatherers directs the stalks inward, and so as to be readily struck and held by the reel I while being cut, after which it is obvious that the cut stalks will be lodged within the frame A B upon the rake, presently described.

$n\ n$ is a series of stalk-receiving arms occupying normally a horizontal position in the frame A B, as indicated in full lines, and having their common head P suspended by means of vertical bars P' from the shaft $m$, journaled in the upper end of one of the uprights or standards $j$ and in a similar upright $j'$ at the rear end of the frame A B; also suspended from the same shaft $m$ by means of a bail $o$ is a series of strippers $l\ l$, fixed at their outer ends to the top cross-bar of the said bail, and having their downward-curved free ends arranged intermediately of the series of stalk-receiving arms $n\ n$ to readily detach or shove the load off the said arms.

The strippers $l\ l$, with their suspending-bail $o$, are manipulated or operated by a hand-lever L, fixed at its lower end to one end of a shaft L', journaled in uprights $s\ s$ at the stubble side of the frame A B, and connected by rods N to staples 3 on the cross or connecting bar of said bail. The lever L is held at the desired point of adjustment by the usual ratchet and pawl $r$.

The stalk-receiving arms $n\ n$, with their suspending-bars and cross-bar, are also operated through the handle or lever L and shaft L', in connection with a rod N', connected by staples 4 to the cross-bar P of the hangers or bars P' and to an arm $M^\times$ of said shaft. This arm $M^\times$ of the shaft L' extends downward and inward, while the arm M of said shaft, to which the rod N of the strippers $l$ is connected, extends upward and outward, and is about only half as long as arm $M^\times$, whereby in properly actuating or moving the lever L as the arms $n\ n$ are withdrawn, as indicated in dotted lines in Figs. 1 and 2, the strippers $l\ l$ will be moved in the opposite direction, as indicated in dotted lines in the same figures. This enables the strippers to shove or remove the stalks from the arms $n\ n$, and thus discharge their contents. Upon the opposite side of the frame A B is similarly disposed a longitudinal shaft $o'$, having a series of arms $p$, reaching inward and nearly meeting the strippers $l\ l$, as seen in Figs. 1 and 2 in dotted lines, when the stalk-receiving arms $n\ n$ are withdrawn to discharge their contents for the purpose of receiving the falling or cut stalks at this juncture of the operation of the arms $n\ n$. The shaft $o'$ is supported at one end upon the other of the uprights $j$ and an upright $j'$ at the rear end of the frame A B.

The rod Q', connected to a bell-crank Q at the rear end of the shaft $o'$ and to a bell-crank M'' at the rear end of the shaft L', effects, as the lever L (through which, as has been observed, all the other adjustments of the arms $n$ and strippers $l$ have been effected) is suitably manipulated, the bringing of the holding-arms $p$ into the aforesaid dotted-line position simultaneously with the bringing of the strippers $l$ into their dotted-line position. Below these latter-described parts are arranged series of downward-inclined fingers 2 2, one series being disposed upon each side of the frame A B and reaching well toward the middle, for effecting the proper discharge or disposition of the stalks as they fall to the ground. These fingers are bolted or secured at their upper ends to side bars B' of the frame A B, as seen in Figs. 2 and 4.

$w$ is the draft-pole or tongue connection, $v$ is the driver's seat, and $w'$ is the foot-rest.

In the modification as disclosed in Fig. 5 the end of the shaft F carrying the sliding pinion D' is provided with a rectangular shoulder F', which is let into a corresponding socket or recess F'' in the said pinion and extending about midway thereof. By this arrangement it will be seen that by properly manipulating the lever E the pinion D' may be slid or moved so as to allow the shoulder F' to be withdrawn from the socket F'', and thus uncouple the pinion from the shaft and yet permit the pinion to remain in gear with the driving-wheel $a'$ without affecting or rotating the shaft F.

Having thus described my invention, what I claim as new, and desire to secure by Letters Patent, is—

1. A corn-harvester having the reel consisting of opposite middle bars and end bars, the middle bars having the connections between outer ends of the same extending at right angles therewith and parallel with the axis and the connections between the outer ends of the middle bars and the outer ends of the end bars crossing each other, substantially as specified.

2. The combination of the stalk-receiving arms with their head or cross-bar suspended by pivoted bars, the strippers connected to a pivoted bail, the additional stalk-receiving arms having their shaft supported upon the carrying-frame, and the hand-lever fixed to a shaft connected by rods and bell-cranks to said strippers and both of said series of stalk-receiving arms, substantially as specified.

3. In a corn-harvester, the combination of the horizontal receiving-arms secured to a head which is suspended by swinging bars, the curved strippers secured to a swinging bail, and the operating-lever provided with a shaft having oppositely-extending arms, which are respectively connected to the bail and the head of the receiving-arms, substantially as specified.

4. In a corn-harvester, the receiving-arms having a head P, which is carried by swinging bars, the strippers affixed to a swinging bail, and the shaft provided with lateral oppositely-extending arms, which are connected to the bail and the head P, whereby the said receiving-arms and strippers are simultaneously operated in opposite directions, in combination with additional receiving-arms suspended opposite to said arms and strippers and connected to the said shaft, whereby they swing in the same direction as the strippers, substantially as specified.

5. In a corn-harvester, the combination, with the supporting-frame having front uprights $j\,j$ and rear uprights $j'\,j'$, of the longitudinal shafts $o'$ and $m$, journaled in said uprights on opposite sides and in rear of the cutters, a series of swinging receiving-arms suspended from the shaft $m$ and connected to an operating-shaft, a series of receiving-arms $p$, suspended from the shaft $o'$ and connected to said operating-shaft, whereby the opposite series of receiving-arms move simultaneously in opposite directions, and the swinging strippers suspended from the shaft $m$ and connected to the said operating-shaft to move simultaneously in the same direction as the arms $p$, substantially as specified.

In testimony whereof I affix my signature in presence of two witnesses.

JOHN ARMSTRONG.

Witnesses:
 CLARK BLACK,
 J. S. WINANS.